(12) United States Patent
Thornton

(10) Patent No.: US 6,508,327 B1
(45) Date of Patent: Jan. 21, 2003

(54) ENABLING TRACTOR

(76) Inventor: Srvin Mack Thornton, 71 County Rd. 233, Laurel, MS (US) 39443-8620

( * ) Notice: Subject to any disclaimer, the term of this patent is extended or adjusted under 35 U.S.C. 154(b) by 0 days.

(21) Appl. No.: 10/027,503

(22) Filed: Nov. 27, 2001

(51) Int. Cl.[7] .............................................. B60K 28/06
(52) U.S. Cl. ................ 180/273; 180/312; 280/124.113; 280/778
(58) Field of Search ........................... 280/778, 93.503, 280/93.504, 124.111, 124.113; 180/312, 366, 373, DIG. 900; 74/481

(56) References Cited

U.S. PATENT DOCUMENTS

| | | | | |
|---|---|---|---|---|
| 99,166 A | * | 1/1870 | Crandall ..................... | 280/265 |
| 513,773 A | * | 1/1894 | Farrell ........................ | 112/270 |
| 659,581 A | * | 10/1900 | Coburn ....................... | 180/350 |
| 3,047,085 A | * | 7/1962 | Kieffer, III et al. .......... | 180/366 |
| 3,375,740 A | * | 4/1968 | Bottum ....................... | 180/335 |
| 3,477,439 A | * | 11/1969 | Hamouz et al. ............. | 180/366 |
| 3,512,599 A | * | 5/1970 | Hott et al. ................... | 180/217 |
| 3,612,203 A | * | 10/1971 | Kuecker ...................... | 180/366 |
| 3,747,724 A | * | 7/1973 | Daloz .......................... | 180/373 |
| 4,132,121 A | * | 1/1979 | Clarke ......................... | 180/366 |
| 4,195,858 A | * | 4/1980 | Goodacre .............. | 280/93.504 |
| 4,408,772 A | * | 10/1983 | Hollwarth ................ | 114/144 R |
| 4,574,902 A | * | 3/1986 | Irimajiri ..................... | 180/312 |
| 4,641,849 A | * | 2/1987 | Andre ........................ | 280/270 |
| 5,238,267 A | * | 8/1993 | Hutchison et al. .......... | 180/312 |
| 5,322,310 A | * | 6/1994 | Hurlburt ..................... | 180/266 |
| 5,447,321 A | * | 9/1995 | Hurlburt et al. ............ | 180/266 |
| 5,806,622 A | * | 9/1998 | Murphy ...................... | 180/210 |
| 6,089,343 A | * | 7/2000 | Brewer ....................... | 180/291 |
| 6,263,990 B1 | * | 7/2001 | Liu ............................. | 180/65.1 |

FOREIGN PATENT DOCUMENTS

| JP | 52062818 | * | 5/1977 |
|---|---|---|---|
| JP | 64004624 | * | 1/1989 |

* cited by examiner

*Primary Examiner*—Paul N. Dickson
*Assistant Examiner*—Deanna Draper
(74) *Attorney, Agent, or Firm*—John D. Jeter

(57) ABSTRACT

An enabling tractor arranged for small crop cultivation, even by those with some manual handicaps, has four wheels with two powered rear wheels and caster type steering controlled by hand an foot levers that move in unison and in sympathy with the steering movement of the front wheels. The chassis has an open center for direct access of the operator to carried tilling apparatus while the tractor continues forward under steering control. Power delivery to the drive wheels is optionally controlled by a clutch arrangement that minimizes maintenance problems.

13 Claims, 4 Drawing Sheets

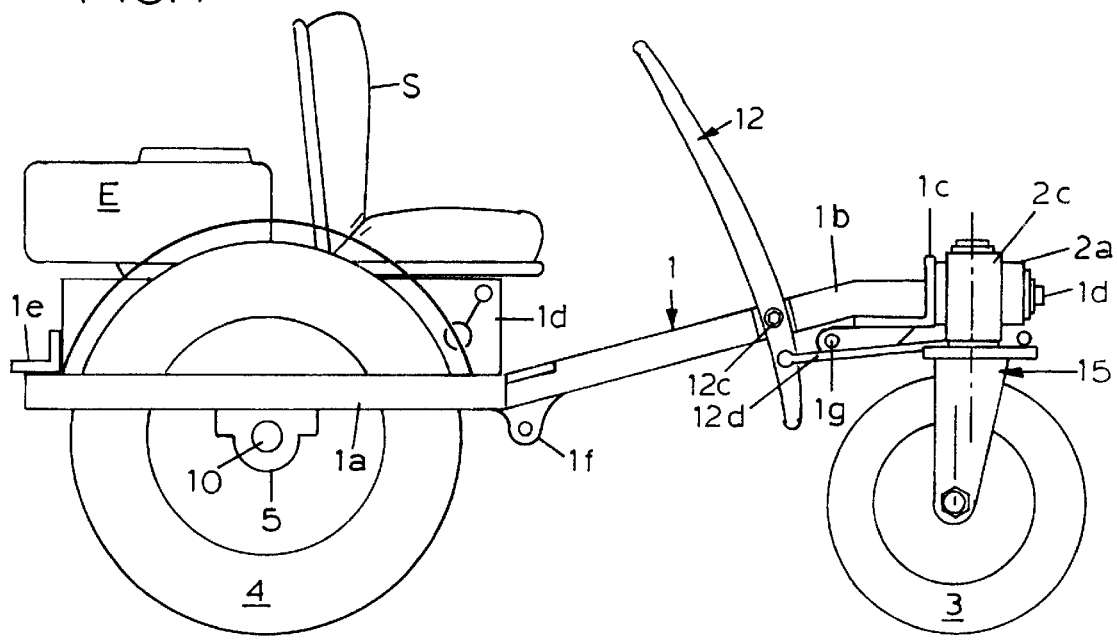
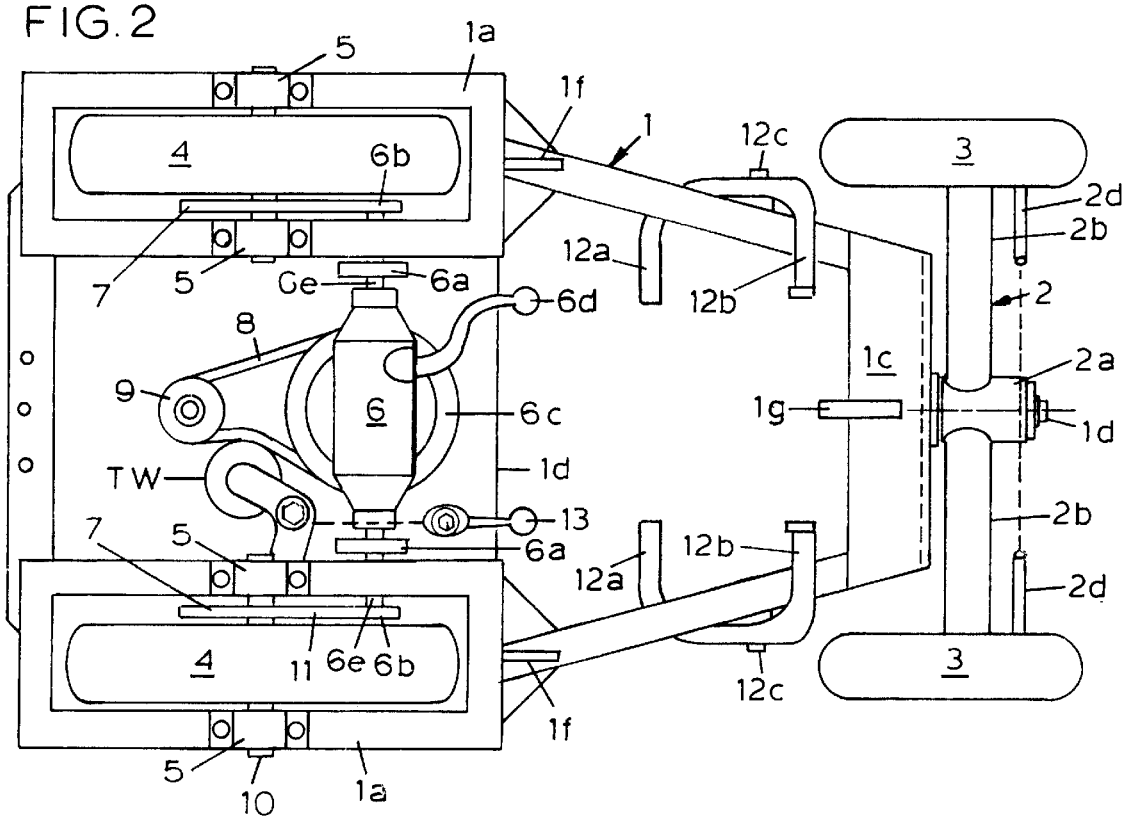

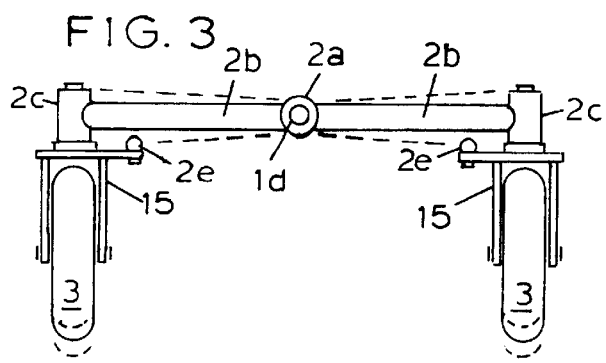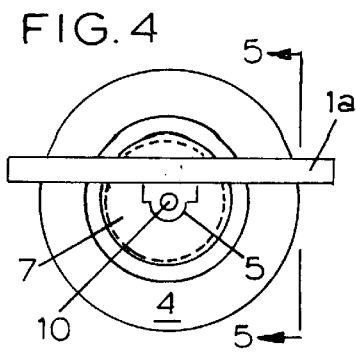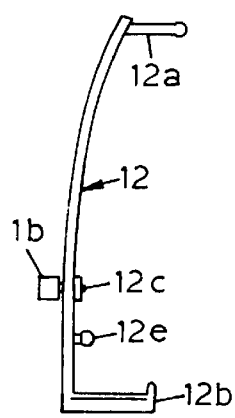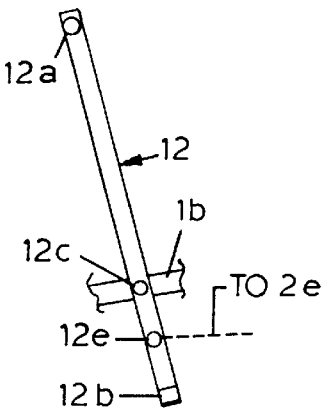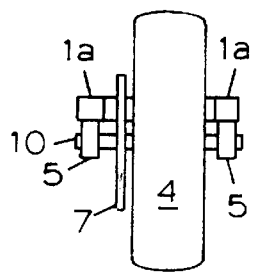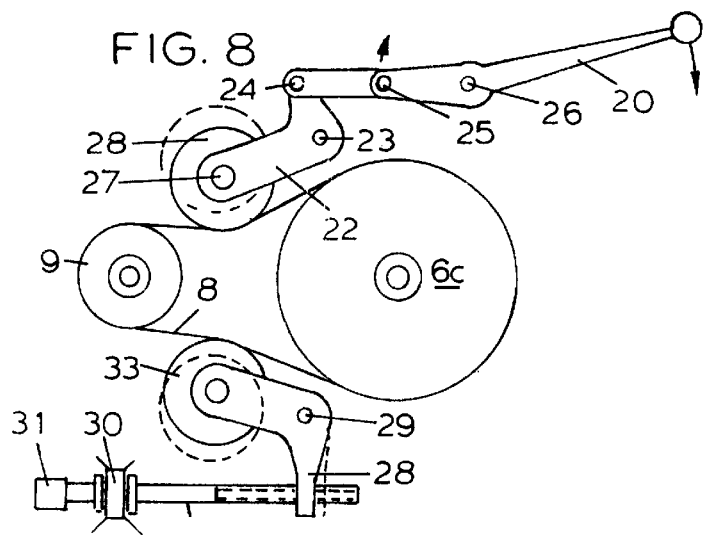

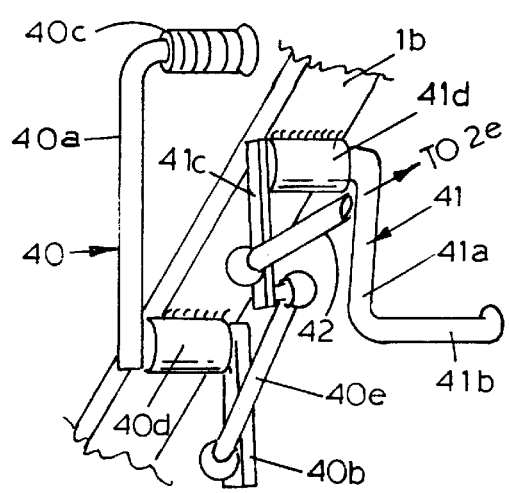
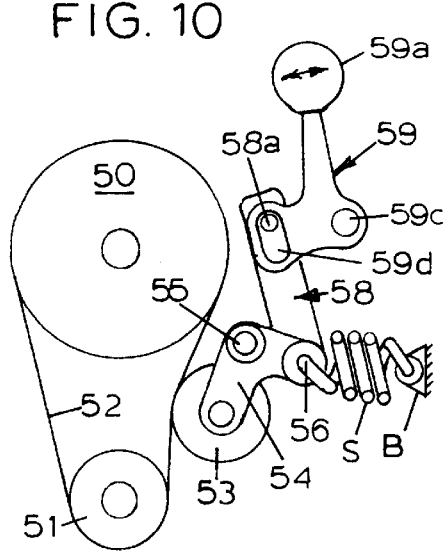
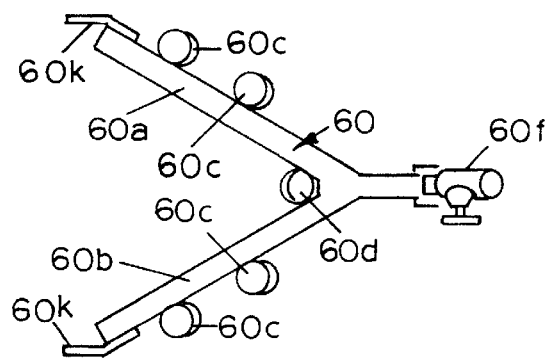
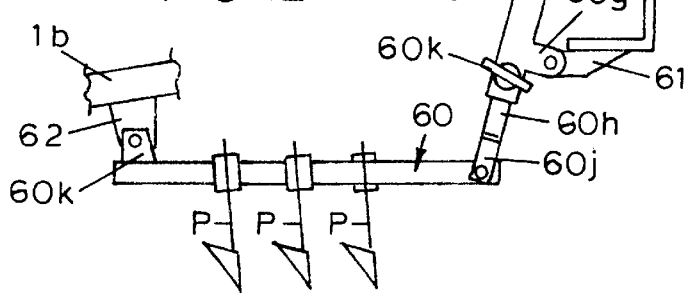

ENABLING TRACTOR

This invention relates to four wheeled garden tractors. More particularly it pertains to garden tractors of configurations adapted to mounting various and different implements. Still more particularly it pertains to tractors configured for mounting the implements between front and rear wheels in full unobstructed frontal and central view of a driver. A further objective, but not in a limiting sense, is a tractor fully manageable by a person with any one limb unusable.

BACKGROUND OF THE INVENTION

Lawn tractors are currently marketed with rear mounted engines, usually rigged for driving lawn mowers mounted between front and rear wheels but there is a deck fitted with a steering wheel in the immediate front of the driver. Such decks are just high enough for a belly mower to be raised slightly above the usual grass cutting level. Such decks obstruct the drivers view of a row of crops over which the tractor could be moving.

On tractors specifically designed for row crops, the driver cannot steer the tractor and directly manipulate mounted implements, pull weeds, or pick selected crop products with both hands without losing control of the forward moving tractor.

Occasionally, there is a need to briefly lift vegetation clogged tilling tools for clearing of such clogging without having to manipulate levers or power lifts and without losing some lateral control of the tractor.

Attempts to control weeds in crops by tilling implements requires that some soil moving plows, discs, or sweeps move very close to the crop being served. Even brief distractions or loss of lateral control of the tractor damages crops. Many taller crops can be damaged by low clearance tractor parts. On small tractors, straight axles connecting opposing wheels are too low for taller crops, and the usual garden tractor becomes unusable after crops have a certain amount of height.

Garden tractors with little height clearance are usually replaced, when crops get taller, by some form of tilling machine that runs between taller crop rows. That usually mandates walking behind such machines and limits the area of gardens maintainable by individuals, particular older gardeners, especially during summer.

There is a need for a tractor manageable by an individual with three limbs regardless of which limb is useless or missing. This invention provides a tractor manageable as described above with little compromise of utility resulting from a missing limb. Most tractors can be adapted for use by an individual with a particular limb missing. Preferred, is a tractor as described above that will accommodate an operator with any one limb missing, without modification of the machine. Further, a tractor is needed that can be used by different individuals with different handicaps without modifying the tractor.

In some locations, noise is a disabling factor in that engine driven machines cannot be operated. Many large gardens exist under such conditions. There is a need for an options mounting deck that permits substitution of batteries and electric traction motors rather than limiting the configuration to engines.

These and other objects, advantages, and features of this invention will be apparent to those skilled in the art from a consideration of this specification, including the attached claims and appended drawings.

SUMMARY OF INVENTION

The four wheeled, rear engine driven, tractor has independently suspended rear wheels driven by an elevated gearbox and differential, or transaxle, for central ground clearance. The forwardly extending portion of the frame is U shaped, the closed end forward, that is attached to the rear frame portion containing the rear wheel axle supports and rises forward to clear crops. At the forward apex, a pivotable support is provided for a transverse rocking front wheel spreader and steering arrangement. The frame, on each side, supports a generally vertical steering lever with both hand grips and foot stirrups, connected by steering links to the front wheels. The front wheels are interconnected by steering control linkage to assure sympathetic steering of both front wheels. The frame has a generally central opening between the legs of the U-shaped portion of the frame, compromised minimally by the steering levers which rise above the frame on opposite sides.

The central pivot for the front wheel spreader beam is a single rod extending forward from the frame forward apex which is, preferably, of ruggedized tubular construction for stiffness. The wheel spreader beam has terminals to bearingly support vertical steering columns, that carry the caster axles of the front wheels, above the general center of the front wheels. The front wheel axles are transverse the steering columns and somewhat behind the related vertical line of steering rotation to achieve a caster effect to provide steering "feel" or feedback to aid in steering control.

The generally vertical steering levers pivot at the frame level and optional foot stirrups can be selectively mounted to project inward or outward from the levers either above or below the pivot axis. The single steering lever on each side of the tractor can be exchanged for an articulating linkage that permits the foot operated portion of the steering arrangement to be separately mounted forward of the hand control portion of the levers. That divided arrangement accommodates a tall operator without causing the foot engaged portion to move in a direction with too much vertical component. The foot and hand portions of the levers are connected for simultaneous movement.

The tractor frame is shaped, and the front and rear wheel base is situated to accept plow or sweep support and control frames, lawn mower decks, and the like.

Implement mounting is arranged for convenient vertical movement between the use position and the transport position. Optional implement supported components, such as plow sweeps can be adjusted for plowing depth with the implement in the use position. Lifting to the transport position comprises a movement of the plow mounting frame such that it toggles through a compression line between pivoting components at the ends of a two-bar linkage. The implement frame acts as a part of a two bar linkage connecting two spaced pivot points on the tractor frame, and is stable in a raised state or a lowered state.

The operator seat is situated just aft of the central opening of the frame, and just ahead of the engine. Throttle, clutch and gear shift levers, preferably, project forward to riser portions that extend just above a transverse planar structure that connects the two drive wheel assemblies. The engine and transaxle are bolted to the transverse planar structure. The transverse planar structure supports the operator seat.

Drive shafts extend laterally from each end of the transaxle and each terminates in a drive sprocket positioned to carry a drive chain that turns a driven sprocket driving a respective rear wheel. Near each drive sprocket, a bearing block attached to the frame separates the drive sprocket and a brake drum secured to the drive shaft.

A brake band, anchored to the frame, is associated with each brake drum and can apply braking action to the respective drum independently in order to provide independent wheel braking.

The engine, preferably with a vertical output shaft, is connected to the transverse plate and has a vee belt drive pulley that is connected by belt to a driven vee belt pulley on the transaxle. The clutch arrangement, preferably, loosens or tightens the belt.

The clutch control lever and throttle lever are attached to the transverse plate which invites the use of adjustable friction drags. The lever movement resistance can be adjusted to suit the operator. The clutch and throttle levers can be fitted with friction locked adjustable components that permit their manual contact ends to be presented to the operator such that they can be positioned for thigh movement to throw the clutch into or out of engagement while the operators feet (or hands) steer the tractor. The throttle can be made similarly adjustable for operation with the other thigh. Alternatively, by operator choice, the clutch and throttle levers can be positioned for hand operation only.

Each brake can be operated by a manual lever. Optionally, the brake linkage is associated with the steering linkage such that extreme turning positions of the front wheels are associated with brake application of the drive wheel nearest the center of the turning radius involved. Manual operation of each brake is facilitated by levers on the brake related side of the operator.

The various features listed above are not to be viewed in a limiting sense. They are features made convenient by the general layout of the tractor principal structure. Individually, most features cited can be substantially changed without compromising the overall operational nature of the tractor. This is anticipated by and is within the scope of the claims.

BRIEF DESCRIPTION OF DRAWINGS

FIG. 1 is a side view of the tractor with no implements attached.

FIG. 2 is a bottom view of the tractor with no implements attached.

FIG. 3 is a front view of the front wheel spreader beam with wheels.

FIG. 4 is a side view of a rear wheel package assembled.

FIG. 5 is a rear view of the assembly of FIG. 4 taken along line 5—5.

FIG. 6 is an elevation of one steering lever.

FIG. 7 is a projection of the lever of FIG. 6

FIG. 8 is an elevation of an optional belt drive clutch arrangement.

FIG. 9 is a perspective view of distributed steering linkage.

FIG. 10 is an elevation of a drive and clutch arrangement.

FIG. 11 is a top view of an implement frame and plow mounting features.

FIG. 12 is a side view of the implement frame of FIG. 11.

DETAILED DESCRIPTION OF DRAWINGS

Figure 13:
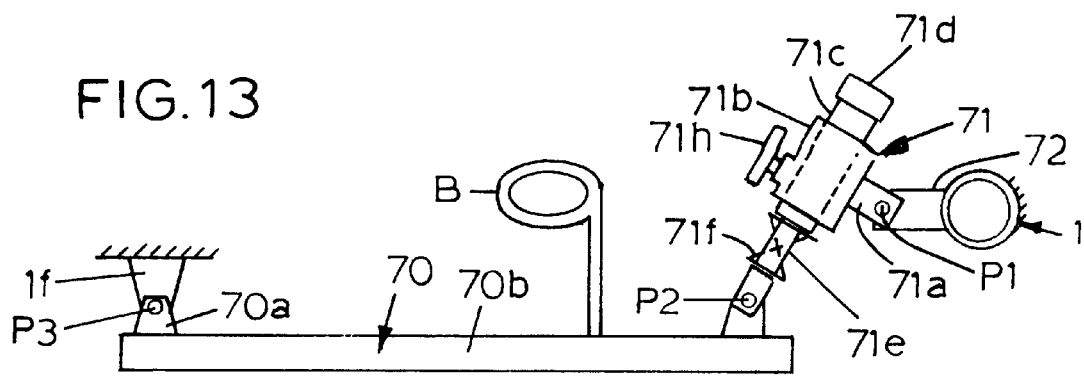
FIG. 13 is side view of an alternate form of implement frame.

The assembled tractor will first be described. In FIGS. 1 and 2, frame 1 extends from the rearmost part of the machine to the pivot bar 1d extending forward from front cross member 1c. Front rocker assembly 2 pivots about the pivot bar 1d on bearings in member 2a. Spreader beams 2b terminate over the front wheels, and include vertical caster boxes 2c. The front wheel assemblies 15 steer by rotating about the centerline of the caster boxes. The front wheels have steering synchronized by connecting link 2d, connected (see FIG. 3) at each end to studs 2e.

Steering is provided by levers 12, pivotably secured to frame longerons 1b by pivot studs 12c. The levers extend upward to provide hand grips 12a convenient to the operator and extend downward to provide foot pedals 12b within reach of the operator. The levers are linked to the front wheel steering mechanism by links 12d. The tractor can be steered by any two of the operators limbs. Steering by one hand, or by one foot is possible if a foot pedal is equipped with the "rat trap" pedal devices commonly available for bicycles.

The rear wheels are powered by an engine (or motor) E by way of a clutch TW controlling tension on belt 8. Speed reduction includes pulleys 9 and 6c, and transaxle 6. Output shafts 6e from the transaxle drive a chain sprocket 6b, chain 11, and final speed reducing chain sprocket 7 on each rear wheel axle 10.

Each rear wheel assembly has an independent axle 10, rotating in pillow blocks 5, chain 11, and drive sprocket 7. Each rear wheel is ensconced in a partial frame 1a that supports the axle.

The frame is completed by securing one rear wheel assembly to each forwardly extending longeron 1b. The securing is preferably by welding if the tractor is to be assembled before shipping. The chassis can be completed by attachment of the front wheel assembly to the pivot bar 1d, and connecting the steering linkages.

The transverse plate 1d is a heavy gauge bent-up structure that associates the rear wheel assemblies into a rigid structure. That rigidity serves the engine (or motor) and transaxle mounting need.

Power source E drives pulley 9 which drives belt 8 and pulley 6c, and finally transmission 6. The axle shafts 6e carry sprockets 6b and brake drums 6a. The sprockets drive the rear wheels 4.

Brake drums 6a rotate about six times as fast as the drive wheels and require a small brake to serve the associated rear wheel. Brake bands are not shown in FIG. 2. The brake bands are each actuated by a hand lever (not shown) and may be actuated by optional linkage to the steering levers. Ideally, the steering levers will actuate a rear wheel brake only when moved to their most extreme position, indicating an effort to minimize the turning radius.

FIG. 3 shows the front wheel spreader assembly 2 with wheels 3 attached. The assembly can rock about the pivot rod 1d of the frame. Bearing box 2a can rotate around pivot bar 1d which is part of the tractor frame. Spreader beams 2b terminate in bearing boxes 2c which are arranged to carry the vertical steering columns of the caster assemblies 15. Steering link balls 2e receive the forwardly extending push rods 12d from the steering levers.

FIG. 4 is a side view of a rear wheel assembly. The rear wheel 4 is ensconced in a frame 1a which supports bearing blocks 5 which carry axle 10. The final drive sprocket 7 is rotationally secured to the wheel.

FIG. 5, taken along line 5—5 shows the relationship of wheel 4 and sprocket 7. By choice, the wheel could rotate relative to a static axle and be driven directly by the sprocket.

FIGS. 6 and 7 show a single steering lever 12 for both hand and foot operation. The lever fastens to and pivots on frame element 1b about axis 12c. Hand grip 12a and foot rest 12b are placed in preferred locations by shaping the lever. Push rod ball 12e provides action for the related ball 2e on the caster assembly 15.

FIG. 8 shows an optional clutch management mechanism. This arrangement makes adjustment easy enough for the clutch control lever to operate a toggle link to reduce manual effort required to apply and release a properly tensioned belt clutch. The operating lever 20 is shown in the no-force position with pivot points 24, 25 and 26 in line. The plane of the drawing is a horizontal plane on the tractor and all rotation axes are vertical, and the view is from below. The arrow on the hand ball of lever 20 points to the operators left. As pivots 24, 25, and 26 approach alignment, very high belt loads can be applied by wheel 28 with little manual effort. That operation demand's a well adjusted belt. To aid in belt adjustment, hand wheel or hex drive 31 is situated for adjustment with the engine running. One rear wheel should be off the ground during adjustment.

With clutch tension wheel 28 lifted clear of the belt 8, input 31 is turned until adjustment bellcrank 28 rotates around pivot 29 until tension wheel 33 tightens the belt just enough to turn the lifted rear wheel, yet allows the wheel to be stopped by slight hand resistance. With rear wheel brakes locked, clutch lever 20 should then move easily through the over-center toggle alignment and should kill the rated engine (or stall a rated motor) by clutch power consumption. Periodic readjustment is simplified.

Pivot points 26, 23, and 29 are secured to the transverse plate. Pivots 24, 25, and 27 float. Threaded rod 32 is axially fixed and free to rotate in stationary pillow 30. Bell crank 28 carries belt tensioning wheel 33. Bell crank 22 carries the belt tensioning wheel 28. Engine drive pulley 9 and driven wheel 6c can be on fixed centers.

FIG. 9 shows an alternate linkage arrangement for the steering mechanism. Hand lever 40 pivots about a transverse axis in bearing 40d, has grip 40c on extension 40a. Crank 40b, connected to lever 40 moves drag link 40e. Foot control 41 moves in sympathy with the hand lever. Pedal 41b is part of lever 41a which is supported in transverse bearing unit 41d to move in sympathy with crank 41c which is connected to the hand lever 40a by way of drag link 40e which connects cranks 40b and 41c. Both hand and foot related controls are connected to the front wheel steering arrangement by link 42 which connects to connector ball 2e of FIG. 3. A similar, but mirrored, steering assembly is situated on the opposite side of the frame.

FIG. 10 shows an alternate power clutch assembly for use where less skillful maintenance is indicated. The clutch requires no adjustment during a normal drive belt life. The clutch control linkage is served by an over-the-center toggle linkage which tends to force it to the extreme of whatever on or off situation is last entered. Like toggle linkage in general, it has to be forced out of it's extreme positions. For use on a highly stressed drive belt, that can result in an uncomfortable force for manual operation of a lever. The first motion force is made manageable by an inertia unit 59a on the hand lever, in conjunction with a lost motion feature, slot 59d and pin 58a, in the linkage.

Engine drive pulley 51 drives transmission input pulley 50 through belt 52. Tension wheel 53 moves to apply a side load on the belt to produce belt tension. Crank 54 pivots about frame mounted standard 55 and carries the wheel 53.

Spring S is a compression spring which applies force between frame mounted bracket pivot point B and crank pin 56. Crank pin 56 also connects link 58. When the tension wheel is moved from one extreme to the other, the spring force on pin 56 moves across the line connecting pivot 55 and bracket B. That action defines the over-the-center toggle action well known to those skilled in the art of machine construction. The spring will force crank 54 to the extreme of the position approached, holding the clutch safely disengaged or suitably applying tightening force to the belt.

Actuation force is reduced because lost motion gap 59d on control 59 allows mass 59a to gain momentum, when moved manually, such that when pin 58a engages the end of the gap the needed energy to bring crank pin 56 to the crossover point of the spring force vector will have been invested.

FIGS. 11 and 12 represent an implement frame 60 adapted for mounting under the frame of the tractor. Mounting points 61 and 62 are on the tractor frame and pad eye 1f can serve that function. Assembly 60f has clevis mount 60g that pins to mounting point 61 on the tractor frame and pad eye 1g can serve that function. Tube 60h telescopes into tube 60e and is held in place by screw 60k. Tube 60e has clevis end 60j pinned to the end of the implement frame. Frame 60 has means for adjusting and securing plow sweep shanks P in tubes 60d and 60c. Ears 60k, one on each side bar 60a and 60b, are pinned to frame mounting points 62. Mounting point 62 is on frame member 1b on the tractor. The pad eye 1f can serve that function. The implements plows are individually adjusted and the assembly is adjusted for working depth by positioning tube 60h, and securing screw 60k.

Figure 14:
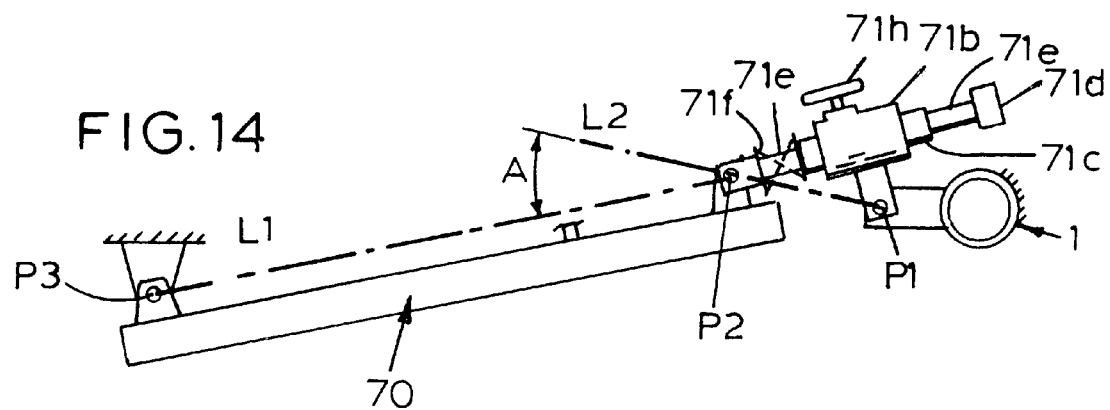
FIG. 14 is a view identical to FIG. 13 but with the implement frame raised.

FIGS. 13 and 14 represent alternate configuration for the implement suspension of FIGS. 11 and 12. This is the quick lift feature that does not disturb plow settings when turning between rows and in transport situations. Mounting points 72 and 73 are on the tractor frame, and pad eyes 1g and 1f can serve those functions. Adjust assembly 71 has an outer tube 71b that has a clevis mount 71a that pins at P1 to mounting point 72, Tube 71c is slidable in tube 71b and lockable in an axial position by hand screw 71h. Rod 71e slides between limits in tube 71c. Spring 71f pushes the rod 71e to the extended limit, stopped by flange 71d. Rod 71e has clevis end 71g which pins to frame 70 at P2. At the back, frame 70 is pinned to the frame mount point 73 at P3.

Earth working tools will be attached to frame 70 and the work position is shown in FIG. 13 (see FIG. 12). When ready to lift plows, the operator will pull upward on lift bar B until the point P2 passes through the line between P1 and P3. The line of action of resultant spring force is on a line from P1 to P2. P1 and P2 are free pivots and that is the only line along which spring force can act. Spring 71f and the bearings in assembly 71 accept that direction. The implement is secured upward until the operator pushes it downward. When pushed to toggle through the P1 to P3 line, it goes to the lower limit set by handwheel 71h. The angle A between lines of force, and spring force, determine the degree of stability in the lifted position. This is particularly important to the disabled.

From the foregoing, it will be seen that this invention is one well adapted to attain all of the ends and objects hereinabove set forth, together with other advantages which are obvious and which are inherent to the tractor.

It will be understood that certain features and sub-combinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

I claim:

1. A four wheel power driven tractor with two front and two rear wheels, the tractor comprising:
   a) two rear wheels, each wheel arranged to rotate around a horizontal with the axle mounted on an enclosing frame work situated above the axle, with drive means arranged to drive the wheel;
   b) a frame comprising, principally, one transverse header beam and two rearwardly extending members, one on each end extending back to and, secured to, the enclosing frame work, and a generally centered pivot bar extending forward from the transverse header;
   c) a spanning transverse generally planar structure situated above and connecting the enclosing frame works;
   d) front wheel support structure comprising a bearing box arranged for mounting on the pivot bar for limited rotation thereon, with front wheel support beams extending in each lateral direction therefrom, each terminating in a bearing box with a vertical axis;
   e) a caster wheel strut situated in each vertical bearing box, arranged to extend downward to provide a horizontal axle for mounting a front wheel;
   f) a power unit situated on the transverse planar structure, arranged to drive the rear wheels through a transmission means;
   g) the transmission means including a clutch, gear reduction assembly, differential, and power delivery linkage, including the drive means, to the rear wheels;
   h) a manual steering means comprising two hand levers and two foot pedals, with associated linkage to move the levers and the pedals in sympathy and to move the front wheels in a steering response action relative to the sympathetic movement.

2. The tractor according to claim 1 wherein said steering means comprises two levers, each comprising an independently suspended hand lever component and separate foot pedal component, the two components interconnected by linkage for sympathetic movement.

3. The tractor according to claim 1 wherein said transmission means supplies power through a belt drive having a separate belt slack adjusting means and belt tensioning clutch means to control delivery of power from the power unit.

4. The tractor according to claim 1 wherein each front wheel contributes to control of tractor movement direction by pivoting about a generally vertical axis above each front wheel.

5. The tractor according to claim 1 wherein the rear wheels have the transmission protected from strain and flexure of the frame by mounting each rear wheel in an independent frame and connecting the independent frames directly by the structure that carries the transmission means.

6. The tractor according to claim 1 wherein said transmission means is arranged such that power is delivered from the power unit by a belt and pulley arrangement served by a clutch that functions to loosen or tighten the belt by a tension wheel that moves between a toward position and an away from position relative to the belt under the influence of a toggle linkage that biases the tension wheel toward either of said positions, when in either of said positions, the toggle linkage arranged to be moved through it's travel range by a manual lever associated with an inertia weight and a lost motion provision, to allow some movement of the lever without moving the tension wheel, to permit energy to be invested in the inertia weight, being manually moved, to aid in moving the tension wheel from the position to which it is biased, whereby the toggle bias serves to eliminate the need for belt wear related adjustment of the tensioning assembly.

7. The tractor according to claim 1 wherein suspension means is provided to carry soil engagement means, the soil engagement means to function as a two point linkage, with aft pivot points laterally separated, attached to a forward pivot point on the tractor frame by a compression spring loaded two point linkage arranged to allow the resulting two bar linkage to toggle through a line between fore and aft attachment points to secure the soil engagement means in an up or a down position, the down position being established by adjustable travel limit means for soil engagement control, whereby the implement framework can be lowered or raised by lifting up or pushing down the soil engagement means.

8. A four wheel power driven tractor with two front and two rear wheels, the tractor having a chassis comprising a power framework, a forwardly extending framework and a front wheel suspension framework, the tractor comprising:
   a) two rear wheel assemblies, each wheel arranged to rotate around a horizontal axle with the axle mounted on an enclosing framework situated above the axles, with transmission means arranged to drive the wheel;
   b) a spanning transverse generally planar structure situated above and connecting the rear wheel assemblies, situating the drive wheels laterally spaced apart in a rigidly fixed relationship, to comprise a power framework;
   c) the forwardly extending framework comprising one transverse header beam and two longitudinal members, one on each side, extending back to, and secured to, the power frame work, and a generally centered pivot support extending forward from the transverse header;
   d) the front wheel suspension framework comprising a bearing box arranged for mounting on the pivot support for limited rotation about a longitudinal axis wheel, a caster wheel strut situated to extend from each vertical bearing box, arranged to extend downward to provide a horizontal axle for mounting a front wheel, and a front wheel mounted on each horizontal axle;
   e) a power unit situated on the transverse planar structure, arranged to drive the rear wheels through the transmission means;
   f) the transmission means including a clutch, gear reduction assembly, differential, and power delivery linkage to the rear wheels;
   g) a manual steering means comprising two hand levers and two foot pedals, with associated linkage to move the levers and the pedals in sympathy and to move the front wheels in a steering response action relative to the sympathetic movement.

9. The tractor according to claim 8 wherein said steering levers each comprise an independently mounted hand lever component and separately mounted foot pedal component the hand lever and foot pedal components interconnected by linkage for sympathetic movement.

10. The tractor according to claim 8 wherein said transmission means delivers power through a belt drive having a separate belt slack adjusting means and belt tensioning clutch means to control delivery of power from the power unit.

11. The tractor according to claim 8 wherein the rear wheels have transmission means protected from strain and flexure of the frame by mounting each rear wheel in an independent frame and connecting the independent frames directly by the structure that carries the transmission means.

12. The tractor according to claim 8 wherein the transmission means comprises a belt and pulley arrangement served by a clutch control assembly that functions to loosen or tighten the belt by a tension wheel that moves between an engaged position and a disengaged position under the influence of a toggle linkage that biases the tension wheel toward the nearest of said positions.

13. The tractor according to claim 8 wherein suspension means is provided to carry soil engagement means, the soil engagement means to function as a two point linkage with aft pivot points laterally separated and pivotably attached to the forwardly extending framework, and attached to a forward pivot point on the forwardly extending framework by a compression spring loaded two point linkage arranged to allow the resulting two bar linkage to toggle through a line between the fore and aft attachment points to secure the soil engagement means in an up or a down position, the down position being established by adjustable travel limit means for soil engagement control, whereby the implement framework can be lowered or raised by lifting up or pushing down the soil engagement means.

* * * * *